J. R. VAN AMBER.
GLARE STOP.
APPLICATION FILED APR. 18, 1921.

1,399,673.

Patented Dec. 6, 1921.

Inventor
John R. Van Amber.
By Harry D. Wallace
Attorney

UNITED STATES PATENT OFFICE.

JOHN R. VAN AMBER, OF WATERTOWN, NEW YORK.

GLARE-STOP.

1,399,673.            Specification of Letters Patent.      Patented Dec. 6, 1921.

Application filed April 18, 1921. Serial No. 462,306.

*To all whom it may concern:*

Be it known that I, JOHN R. VAN AMBER, a citizen of the United States, residing at Watertown, in the county of Jefferson and State of New York, have invented certain new and useful Improvements in Glare-Stops, of which the following is a specification.

This invention relates to improvements in glare-stops, and has for its object to provide novel, simple, and effective means for preventing the head-lights of automobiles from blinding the drivers of vehicles approaching the automobiles. A further object is to provide a novel and simple transparent glare-stop preferably made of colored glass or sheet celluloid which may be readily and adjustably applied to the usual wind-shields of motor and other vehicles, the device being disposed directly in front of the driver of the vehicle, and being held in place by the tension of certain of its parts. And a further object is to generally improve and simplify the construction, arrangement and operation of devices of the class.

I attain these objects by the means set forth in the detailed description which follows, and as illustrated by the accompanying drawing, in which—

Figure 1:
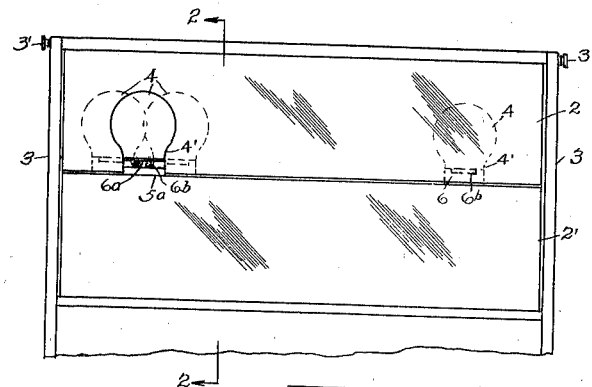
Figure 2:
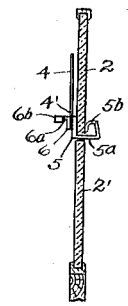
Figure 4:
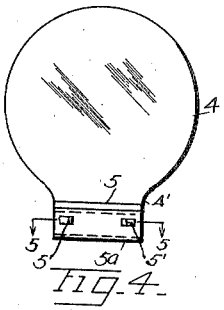
Figure 3:
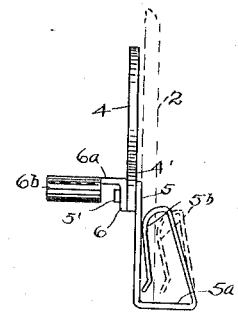
Figure 5:
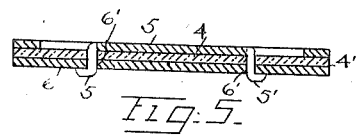
Figure 6:
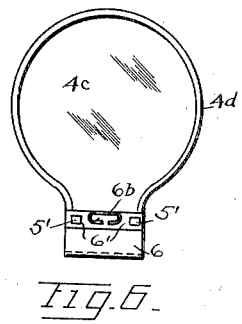

Figure 1 is a broken rear elevation of the wind-shields of an automobile, to which my improvement is applied. Fig. 2 is a vertical cross-section, taken on line 2—2 of Fig. 1. Fig. 3 is an enlarged edge view of the glare-stop. Fig. 4 is an enlarged front face view of the same. Fig. 5 is an enlarged horizontal section, taken on line 5—5 of Fig. 4. Fig. 6 is a rear side elevation of a modified form of the device. And Fig. 7 is an edge view of the same.

In the drawing, 2 represents the movable top section of the usual wind-shield of an automobile, and 2' is the lower section of the shield, the said sections being supported by the usual uprights 3.

My improved glare-stop comprises a substantially disk-shaped transparent part 4, which may be made of glass or sheet celluloid of any suitable color, which dims or destroys the dazzle or glare of the bright head-lights of approaching vehicles, and enables the driver of an automobile to readily and safely steer his machine, without danger of being blinded or confused by the head-lights of other cars. The transparency 4 has a reduced lower end 4', which is rigidly clamped between two metal plates 5 and 6; the said plates being rigidly held together by means of tongues 5' which are struck out of the plate 5, and which pass through perforations $4^a$ in the transparency 4 and also through registering perforations 6' in the plate 6. The free ends of the tongues 5' are clenched against the rear face of the plate 6, as best seen in Figs. 3, 4 and 5. The plate 5 is preferably made out of spring metal and its bottom portion $5^a$ is first bent outwardly at right angles to the transparency 4, and is then bent upwardly preferably at an angle to the part 4, after which the said portion is curved inwardly and downwardly to form a hook $5^b$, which engages the outer face of the wind-shield 2 and exerts its tension for resiliently holding the glare-stop in place. The rear plate 6 is disposed vertically against the rear face of the transparency 4, and is provided with an integral portion $6^a$, which is disposed at right angles to the body 6, and is preferably folded or rolled at its lateral edges to afford a convenient hand-grip, as $6^b$. The device shown in Figs. 1 to 5 inclusive is intended to be applied to the bottom edge of the wind shield 2. To accomplish this, the top shield is preferably swung on its pivots 3' away from the shield 2' sufficiently to allow the top bend of the hook $5^b$ to be placed against the lower edge of the shield. The device is then forced upwardly until the lower edge of the shield comes to rest against the horizontal portion $5^a$. This wedges the bottom edge of the shield tightly between the hook $5^b$ and the body of the plate 5. The wind-shield 2 may then be swung back into place, as shown in Fig. 2. The tension of the hook $5^b$ is sufficient to hold the glare-stop from accidental displacement whether or not the wind shield 2 is extended or in the closed position. After the glare-stop is applied, as described, it may be readily and quickly shifted from one position to another, in either direction, as indicated by the full and dotted lines in Fig. 1, by simply sliding the device along the lower edge of the shield 2. By this disposition and arrangement of the glare-stop, the driver of a car always has a clear and unobstructed view of the roadway from either side of the transparency 4, and the glare of approaching headlights, or the sun, cannot blind or otherwise affect his eyes.

Figure 7:
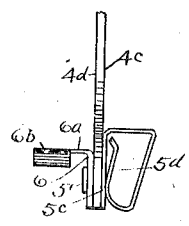

In Figs. 6 and 7, I have shown a slight modification of the glare-stop, which consists of inclosing the transparency 4ᶜ in a protecting frame 4ᵈ, which enables me to use lighter or thinner material for the light dimming part. The plate 5ᶜ together with its spring clamping hook 5ᵈ in this modified structure is inverted, as compared with the device shown in the preceding views. By this disposition and arrangement of the clamping parts, the device may be applied to the top edge of the lowermost shield 2′ in a well-known manner. By thus inverting the clamping parts of the device, the latter is partially held in place by gravity, and is less liable to be accidentally detached by the vibrations of the wind-shield.

Having thus described my invention, what I claim, is—

1. In a glare-stop, a plane transparency having perforations in its lower portion, a pair of plates for clamping said lower portion, one of said plates having integral tongues and having its lower end portion bent outwardly and upwardly and inwardly for resiliently gripping a part inserted between the folded portions of said plate, and the other plate having perforations which register with the perforations in the transparency which receive the said tongues and having an integral handle disposed at right angles to the transparency.

2. A plane transparency, a pair of plates between which the transparency is clamped, one of said plates having integral tongues and having a spring hook for slidably and resiliently gripping the edge of a wind-shield, and the other plate having perforations to receive said tongues and against which the tongues are clenched.

In testimony whereof I affix my signature.

JOHN R. VAN AMBER.